Patented Aug. 4, 1936

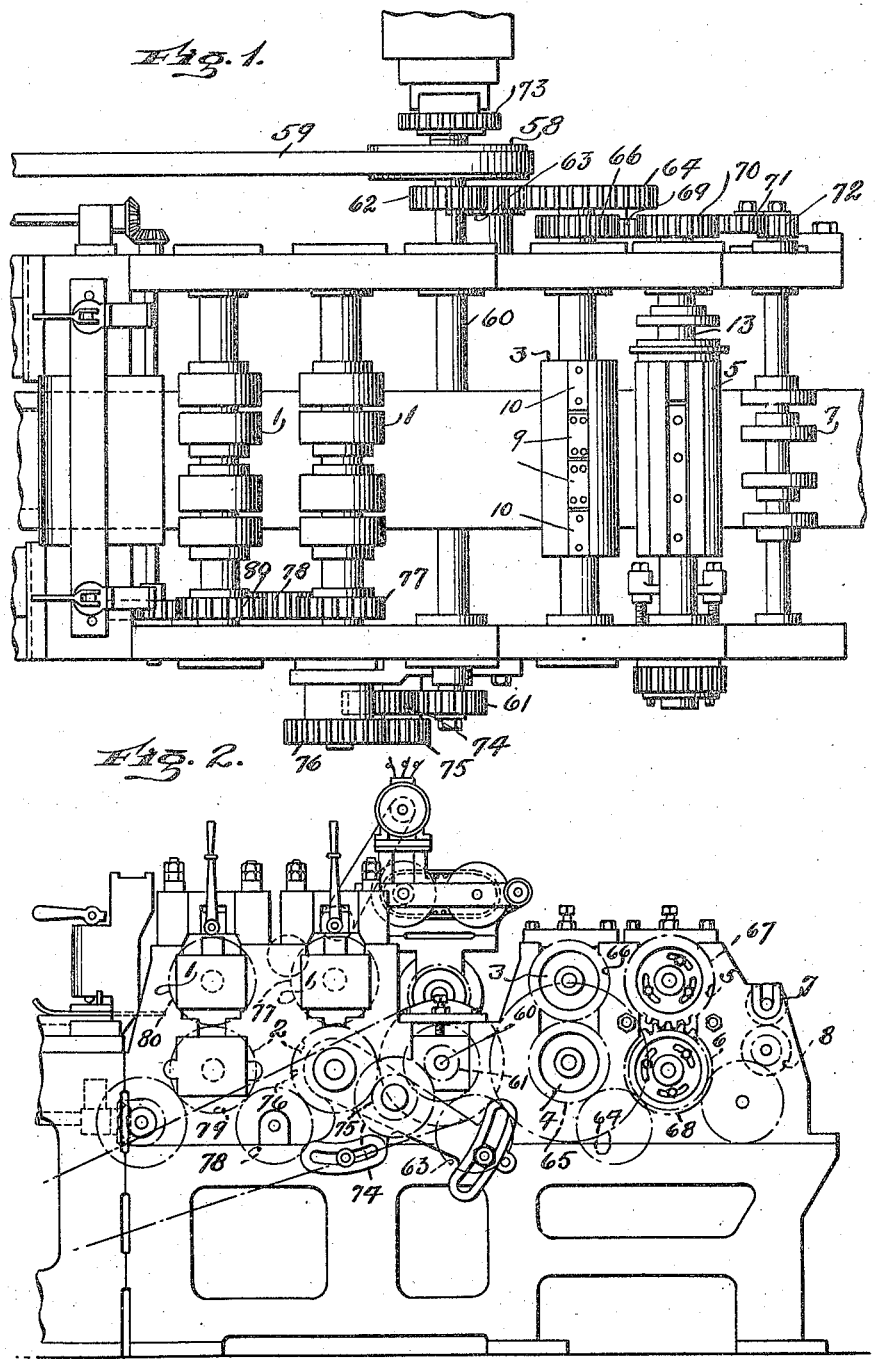

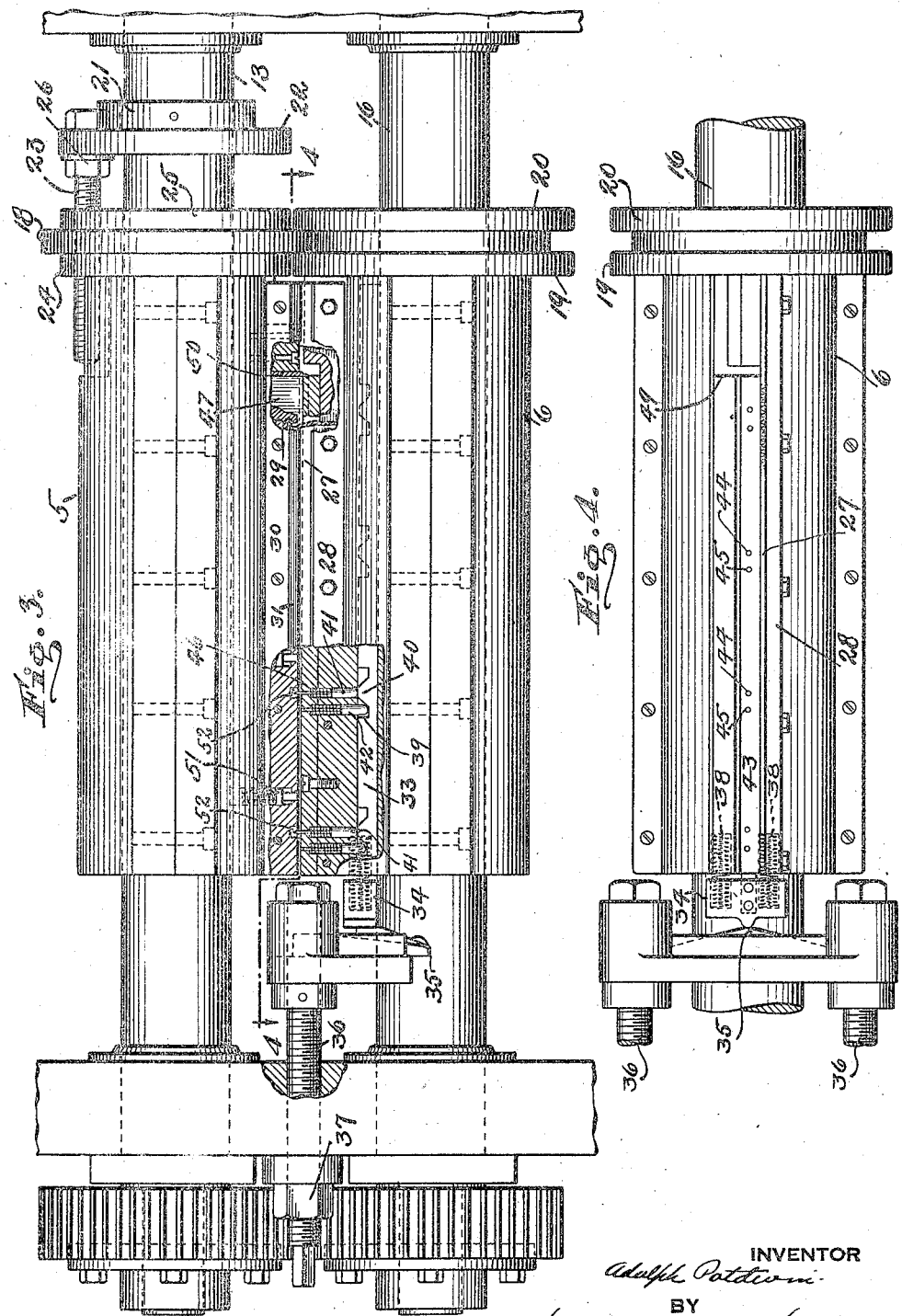

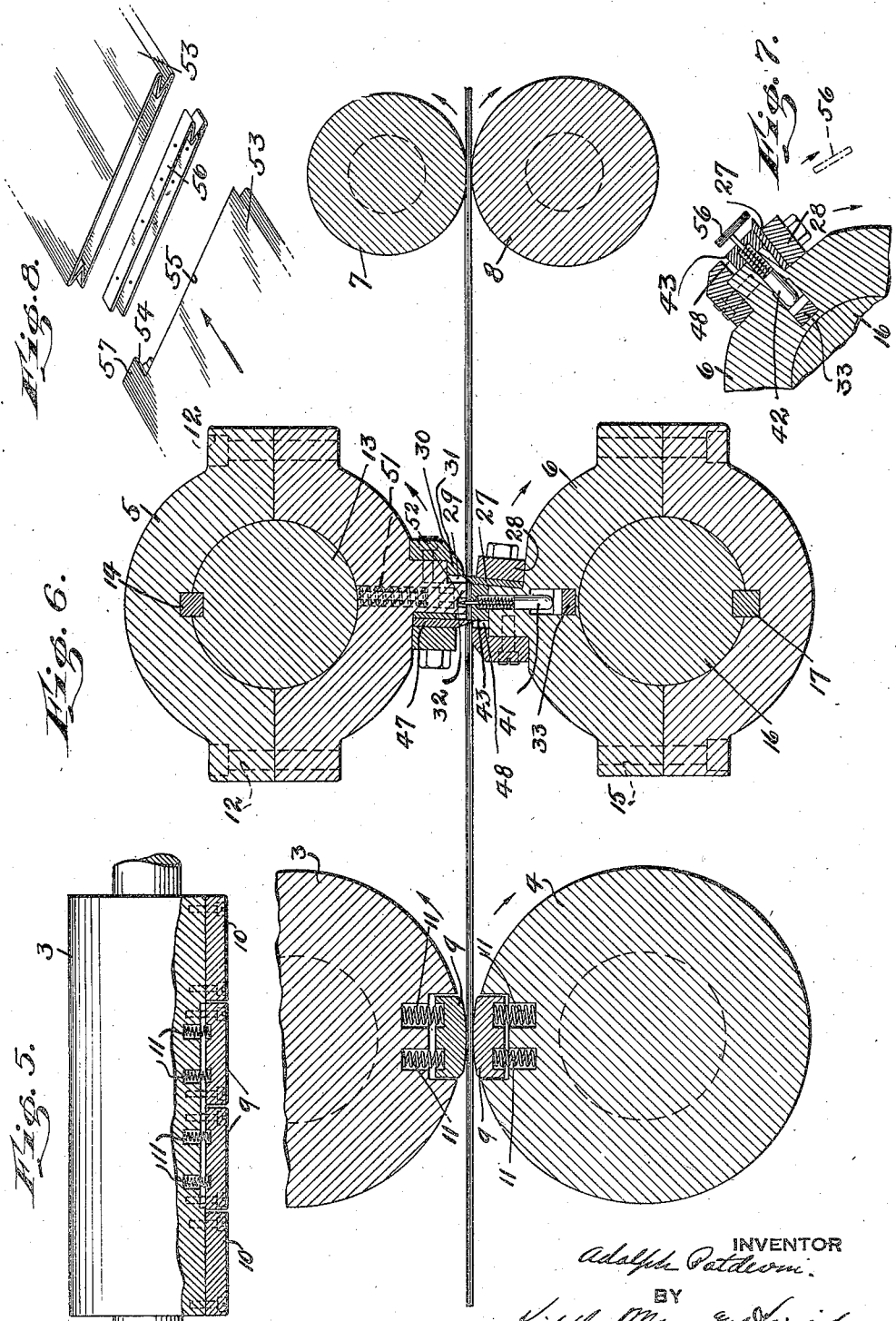

2,049,515

UNITED STATES PATENT OFFICE 2,049,515

CUT-OFF AND DISCHARGE MECHANISM FOR TUBING MACHINES, BAG MAKING MACHINES, AND THE LIKE

Adolph Potdevin, Garden City, N. Y., assignor to Potdevin Machine Company, Brooklyn, N. Y., a corporation of New York Original application November 2, 1931, Serial No. 572,561. Patent No. 1,975,121, dated October 2, 1934. Divided and this application February 28, 1934, Serial No. 713,299

8 Claims. (Cl. 164—61)

This invention relates to tubing machines with particular reference to the cut-off rollers for cutting the tubing into lengths.

This application is a division of my copending application Serial No. 572,561, filed November 2, 1931, now Patent No. 1,975,121, dated October 2, 1934.

In the drawings:

Fig. 1 is a plan view of an embodiment of my invention;

Fig. 2 is an end view;

Fig. 3 is an elevational view of the cutting off rollers partially broken away;

Fig. 4 is a view taken on the line 4—4 of Fig. 3;

Fig. 5 shows in part section a pair of pinch rollers preceding the cutting off rollers;

Fig. 6 is a cross sectional view of the cutting off rollers;

Fig. 7 is a fragmentary view of certain mechanism employed in connection with the cutting off rollers; and Fig. 8 shows the tubing after it has been cut off.

Inasmuch as this application is a division of my copending application above referred to the apparatus by which the material being handled is tubed prior to reaching the feed rollers will not be described in detail, this mechanism being fully disclosed in my copending application above referred to. It is to be noted, however, that the material after it has been tubed passes between the upper feed rollers 1 and lower feed rollers 2, then between a pair of pinch rollers 3 and 4 and from thence between cut-off rollers 5 and 6. The tubing after being cut into lengths is discharged from the machine by discharge rollers 7 and 8.

Each of the pinch rollers 3 and 4 is provided with pinch blocks 9 and 10, these blocks extending lengthwise of the rollers. The blocks 9 which are intermediate the blocks 10 are backed by springs 11. The pinch blocks are so positioned on the periphery of the rollers 3 and 4 as to lie abreast of each other with the rollers in the position shown in Fig. 5 to pinch the web passing between them.

By yieldingly mounting the blocks 9 as above described it will be appreciated that the blocks are able to adapt themselves to any irregularities in the thickness of the tube in its passage through the machine.

The cut-off rollers 5 and 6 are seen best in Figs. 3, 4, 6 and 7. These rollers are not only provided with cutters for cutting or severing the tube as it passes between them but also with expelling mechanism for discharging the waste paper that is cut from the tube to prevent the machine from becoming clogged.

The upper cut-off roller which is designated 5 is clamped by bolts 12 to a shaft 13 to which it is keyed as shown at 14.

The lower cut-off roller 6 is clamped by bolts 15 to a shaft 16 to which it is keyed by a key 17.

At one end of the upper cut-off roller 5 is a flange 18 and at one end of the lower cut-off roller 6 are spaced flanges 19 and 20, these latter flanges 19 and 20 receiving between them the flange 18 on the upper roller 5.

The shaft 13 carrying the upper cut-off roller 5 is provided with a collar 21 rigidly secured thereto. This collar is flanged as shown at 22.

The flange 22 just referred to receives a threaded adjusting member 23 which is threaded through the flanges 24 and 25 on the upper cut-off roller 5 as well as the flange 18 already referred to and which is on the same roller. By loosening the bolts 12 and 15 and adjusting the threaded member 23, endwise movement of the rollers 5 and 6 on their respective shafts 13 and 16 may be effected. This enables the cut-off rollers to be adjusted transversely of the machine to any desired position with respect to a tube passing through the machine.

The adjusting member 23 is held in position by a lock nut 26.

The arrangement just described is very simple and at the same time very useful inasmuch as it permits of adjustment of both of these rollers to exactly the same degree and insures that the knives carried by each of these rollers, and to be referred to hereinafter, will not be moved out of alignment or register with each other in making the adjustment.

As will be seen from Figs. 3, 4, 6 and 7, the lower cut-off roller 6 is provided on its periphery with a knife 27 extending the length of the roller. The knife is clamped to the roller by a plate 28.

The cutting edge of the knife 27 cooperates with a groove 29 which is provided in the upper roller 5 by affixing a plate 30 to the periphery of this roller, this plate having an extension 31 which terminates short of a projection 32 which is provided on the periphery of the upper roller.

Set into the periphery of the roller 6 adjacent the knife 27 is a plate 33. This plate extends parallel to the knife 27 and projects beyond the end of the roller 6, the projecting end carrying a cam follower 34 cooperating with an adjustable fixed cam 35. This cam is mounted on two screw threaded members 36 threaded into the frame of the machine so that by rotating these members the cam 35 can be adjusted right or left, as viewed in Fig. 3, to any desired position.

The adjusting members 36 are held in adjusted position by a lock nut 37. This provides for proper adjustment of the cam with respect to the cam follower 34 when the cutting-off rollers are adjusted lengthwise as I have explained above.

The cam follower 34 is backed by springs 38. It will be appreciated, therefore, that as the roller 6 is rotated the plate 33 which is provided with depressions 39 and high portions 40 will be intermittently reciprocated longitudinally of the roller.

The roller 6 immediately above the plate 33 is provided with a series of pin plungers 41 which extend radially of the roller and with a series of push-off or ejector plungers 42. Immediately above the plungers 41 and 42 and on the periphery of the roller 6 is a plate 43 provided with holes 44 and 45 for receiving the outer ends of the plungers 41 and 42, respectively. Each plunger is provided with a spring 46 which retains the plungers in their inner position so they do not project beyond the periphery of the roller 6 until the proper instant.

Secured to the periphery of the upper cut-off roller 5 is a knife 47 adapted to cooperate with a groove 48 in the lower roller, this groove being similar to the groove 29 in the upper roller.

The knife 47 extends lengthwise of the roller 5 to the point 49 and then peripherally of the roller as shown at 50, it being noted that this upper knife terminates short of the end of the lower knife.

The roller 5 also carries spring pressed plungers 51 provided for the purpose of holding the paper web against the roller 6 at the instant of the cutting-off operation.

The upper roller 5 is also provided in its periphery with depressions 52 which register with the ejecting pins 41.

A fragment of the paper tube is shown in Fig. 8 and referring to this figure for a moment it will be seen that the tube which I shall designate 53 is first divided across its entire width. This is accomplished by the knife 27, the rollers 5 and 6 traveling in the direction of the arrows on Fig. 6, this knife being the first to perform its cutting-off operation.

The cutting-off operation just referred to is followed by cutting the paper or tube lengthwise as indicated at 54. This operation is performed by the portion 50 of the upper knife, this part of the knife extending, as above pointed out, circumferentially of the roller. This cut is followed by a transverse cut 55 which is performed by the main part of the upper knife 47. This last operation cuts the piece 56 out of the web to provide the web 53 with a valve flap 57.

During this operation the plungers 51 engage the web to press the web against the lower roller and as the paper is cut off on the first cut the pins 41 which are moved outwardly by the high spots 40 on the reciprocating plate 33 puncture the portion 56 of the web and remain in this position until this portion of the web is severed from the end of the tube, as above described, whereupon the ejector plungers 42 which are moved outwardly alternately with respect to the pins 41 will function to push this cut-out or waste portion 56 from the pins and allow it to drop down into the bottom part of the machine.

I am thus assured of the machine working properly at all times, this positive ejection of the scrap preventing any clogging of the machine from such source.

As the tube is severed and the cutting operation completed the tube is ejected from the machine by the delivery rollers 7 and 8. These rollers are traveling at an over speed as compared with the speed of the cut-off rollers so as to eject the tube with a quick action.

It will be apparent from the foregoing that the hold-back or pinch rollers 3 and 4 are intermediate the feed rollers 1 and 2 and the cut-off rollers 5 and 6. This is of advantage, as will be appreciated, in insuring accuracy in the valve lengths produced on the machine, inasmuch as regardless of the speed at which the tube may be advanced by the feed rollers 1 and 2 the valves can only be cut into the correct valve length, the setting of these rollers and of the cutting-off rollers determining the valve lengths which otherwise would be determined by the speed of the feed rollers.

The driving mechanism for the feed rollers, the hold-back or pinch rollers 3 and 4 and the cut-off rollers 5 and 6 as well as for the delivery rollers 7 and 8 is best seen in Figs. 1 and 2.

The prime mover may be an electric motor, for example, driving a pulley 58 through the medium of a belt 59. The pulley 58 is freely mounted on a shaft 60 extending transversely of the machine and projecting through the opposite side of the frame thereof where it is provided with a gear 61. Fast with the pulley 58 is a gear 62, and this gear meshes with an idler gear 63 meshing with gear 64 mounted on the shaft of the lower hold-back or pinch roller 4, this shaft also being provided with a gear 65 meshing with a gear 66 on the shaft of the upper pinch roller 3.

The cut-off rollers 5 and 6 are geared together by gears 67 and 68 on one side of the machine and to the shafts of the hold-back or pinch rollers 5 and 6 by gear 69 and intermediate gear 70. The gear 69 on the shaft of the lower cut-off roller is geared to one of the delivery rollers through gears 71 and 72.

To enable the speed of the feed rollers 1 and 2 to be changed I interpose a Reeves drive intermediate the prime mover of the machine and the shaft 60. The driving gear of this Reeves drive is designated 73 and as will be understood is fast with the pulley 58. The shaft 60 which as will be understood is driven through the Reeves drive carries on its end opposite to the drive the gear 61 above referred to and this gear is in mesh with a gear 74. The shaft on which the gear 74 is mounted carries a gear 75 meshing with gear 76 on the shaft of one of the lower feed rollers 2. This shaft carries a gear on the inside of the frame of the machine meshing with gear 77 on the shaft of the upper feed roller 1. The gear 76 is in mesh with the intermediate gear 78 which also meshes with a gear 79 on the shaft of the other of the lower feed rollers 2. The gear 79 meshes with a gear 80 on the shaft of the upper feed roller 1.

What I claim is:—

1. In a tube making machine, upper and lower cooperating cut-off rollers for cutting the tubing into lengths, adjusting mechanism for adjusting one roller lengthwise, and a rigid connection between this roller and its cooperating roller to effect an adjustment to the same degree of the said cooperating roller.

2. In a tube making machine, upper and lower cooperating cut-off rollers, a flange on one roller entering a groove in the other roller, and adjusting mechanism, connected to one roller for effecting a simultaneous adjustment in the same direction and to the same degree of both rollers.

3. In a tube making machine, upper and lower cooperating cut-off rollers, a flange on one roller entering a groove in the other roller, an adjusting member threaded into one of said rollers to effect lengthwise adjustment of both rollers simultaneously in the same direction and to the same degree.

4. In a tube making machine, a pair of cooperating cut-off rollers, a shaft for each roller to which the rollers are keyed, clamping bolts for holding each roller against longitudinal movement on its respective shaft, a flange on one roller entering a groove on the other roller to hold the rollers against independent endwise movement, and adjusting mechanism connected to one roller and operative upon release of said bolts to effect movement of both rollers along said shafts simultaneously in the same direction and to the same degree.

5. In a tube making machine, a pair of cooperating cut-off rollers, positively actuated pins adapted to enter the leading end of the tube prior to the severing operation, and positively actuated plungers for ejecting the cut-off portion of the web from said pins.

6. In a tube making machine, the combination of a pair of cooperating cut-off rollers or cylinders, pins carried by one of said rollers for piercing a portion of the web to be severed from a web passing between the rollers, plungers for removing said paper from the pins after the cutting off operation, a cam plate carried by one of said rollers for effecting alternate movement of the pins and plungers outwardly of the roller, and an adjustable non-rotating cam for effecting reciprocation of said cam plate.

7. In a machine for making valve bags, the combination of feed rollers for continuously advancing the bag material, cutting rollers in the path of the advancing material for severing the material into bag lengths and forming a valve flap on the leading end of each bag length, and pinch rollers in the path of the bag material intermediate the feed rollers and cutting rollers, the operative portions of said cutting rollers and pinch rollers always engaging the bag material at a fixed distance apart whereby on variation in the speed of the feed rollers the bag material will be cut off in varying lengths without varying the length of the valve flap.

8. In a machine for making valve bags, the combination of feed rollers for the continuous forwarding of the bag material, cutting rollers in the path of the advancing material intermittently operable to sever the bag material transversely into bag lengths followed by a longitudinal cut in the leading end of the bag material and a transverse cut to provide a projecting valve flap on the leading end of the bag material, pinch rollers intermediate the feed rollers and the cutting rollers adapted intermittently to engage the bag material throughout the cutting off and flap-forming operation of the cutting rollers, thereby to prevent variations in the length of the valve flaps while permitting of variations in the speed of the feed rollers with a consequent variation in the bag lengths.

ADOLPH POTDEVIN.